(12) United States Patent
Kwon et al.

(10) Patent No.: US 9,587,058 B2
(45) Date of Patent: *Mar. 7, 2017

(54) TRANSPARENT THERMOPLASTIC RESIN COMPOSITION

(71) Applicant: Cheil Industries Inc., Gumi-si (KR)

(72) Inventors: Kee Hae Kwon, Uiwang-si (KR); Jin Hwa Chung, Uiwang-si (KR); Jin Seong Lee, Uiwang-si (KR); Man Suk Kim, Uiwang-si (KR); Kwang Soo Park, Uiwang-si (KR); Ja Kwan Koo, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 116 days.

This patent is subject to a terminal disclaimer.

(21) Appl. No.: 13/740,335

(22) Filed: Jan. 14, 2013

(65) Prior Publication Data

US 2013/0131258 A1    May 23, 2013

Related U.S. Application Data

(63) Continuation-in-part of application No. PCT/KR2010/009538, filed on Dec. 29, 2010.

(30) Foreign Application Priority Data

Jul. 28, 2010   (KR) ........................ 10-2010-0072920

(51) Int. Cl.
| | |
|---|---|
| C08L 43/02 | (2006.01) |
| C08F 230/02 | (2006.01) |
| C08F 220/14 | (2006.01) |
| C08F 220/18 | (2006.01) |
| C08L 33/04 | (2006.01) |
| C08L 33/06 | (2006.01) |
| C08L 33/12 | (2006.01) |
| C08L 33/14 | (2006.01) |
| C08L 51/00 | (2006.01) |

(52) U.S. Cl.
CPC .......... *C08F 230/02* (2013.01); *C08F 220/14* (2013.01); *C08F 220/18* (2013.01); *C08L 33/04* (2013.01); *C08L 33/062* (2013.01); *C08L 33/12* (2013.01); *C08L 33/14* (2013.01); *C08L 43/02* (2013.01); *C08L 51/00* (2013.01)

(58) Field of Classification Search
CPC .............................. C08L 43/02; C08F 230/02
See application file for complete search history.

(56) References Cited

U.S. PATENT DOCUMENTS

| | | | |
|---|---|---|---|
| 3,030,347 A | * | 4/1962 | O'Brien et al. ............. 526/278 |
| 3,210,326 A | | 10/1965 | Tousignant et al. |
| 3,932,321 A | * | 1/1976 | Maki et al. ................. 524/35 |
| 3,985,831 A | | 10/1976 | Boyer |
| 4,409,350 A | | 10/1983 | Fujiwara et al. |
| 5,278,009 A | | 1/1994 | Iida et al. |
| 5,292,817 A | | 3/1994 | Grey et al. |
| 5,663,019 A | | 9/1997 | Matsumura et al. |
| 5,773,533 A | | 6/1998 | Horold |
| 5,827,626 A | | 10/1998 | Kobayashi et al. |
| 5,876,895 A | | 3/1999 | Hishiro et al. |
| 5,998,091 A | | 12/1999 | Suzuki |
| 6,096,852 A | | 8/2000 | Lensvelt et al. |
| 6,624,250 B2 | * | 9/2003 | Zimmerman ................. 525/178 |
| 6,632,891 B1 | | 10/2003 | Tada et al. |
| 7,763,402 B2 | | 7/2010 | Cho et al. |
| 7,863,382 B2 | | 1/2011 | Ishii et al. |
| 8,293,149 B2 | | 10/2012 | Lee et al. |
| 8,486,591 B2 | | 7/2013 | Jeong et al. |
| 8,748,510 B2 | | 6/2014 | Inagaki |
| 2002/0172873 A1 | | 11/2002 | Ueda et al. |
| 2007/0145338 A1 | | 6/2007 | Zakikhani |
| 2008/0242795 A1 | | 10/2008 | Jang et al. |
| 2009/0209697 A1 | | 8/2009 | Persigehl et al. |
| 2010/0152357 A1 | | 6/2010 | Kwon et al. |
| 2010/0160474 A1 | | 6/2010 | Lee et al. |
| 2010/0168272 A1 | | 7/2010 | Park et al. |
| 2010/0240831 A1 | | 9/2010 | Kim et al. |
| 2010/0256288 A1 | | 10/2010 | Kim et al. |

(Continued)

FOREIGN PATENT DOCUMENTS

| | | |
|---|---|---|
| CN | 1121083 A | 4/1996 |
| CN | 101464631 A | 6/2009 |

(Continued)

OTHER PUBLICATIONS

Ebdon et al., "Thermal degradation and flame retardance in copolymers of methyl methacrylate with diethyl (methacryloyloxymethyl) phosphonate", Polymer Degradation and Stability, Barking, GB, vol. 70, No. 3, Jan. 1, 2000, pp. 425-436.*
Nielsen et al; Mechanical Properties of Polymers and Composites; p. 315; 1994.*
Wikipedia; Melt Flow Index; downloaded on Nov. 6, 2015.*
Extended European Search Report in counterpart European Application No. 10855400 dated Nov. 15, 2013, pp. 1-6.
Office Action in commonly owned U.S. Appl. No. 13/353,710 mailed on Feb. 1, 2013, pp. 1-24.
Office Action in commonly owned U.S. Appl. No. 13/190,979 mailed on Feb. 16, 2012, pp. 1-10.

(Continued)

*Primary Examiner* — Karuna P Reddy
(74) *Attorney, Agent, or Firm* — Additon, Higgins & Pendleton, P.A.

(57) ABSTRACT

A resin composition includes a phosphorus-based acrylic copolymer (A) including (a1) an acrylic monomer represented by Formula 1 and (a2) a phosphorus-based acrylic monomer represented by Formula 2 as defined in the specification. The resin composition can have flame retardancy, heat resistance, mechanical properties, and/or flowability, while maintaining properties of high transparency and scratch resistance.

24 Claims, No Drawings

(56) References Cited

U.S. PATENT DOCUMENTS

| | | | |
|---|---|---|---|
| 2011/0009524 | A1 | 1/2011 | Kwon et al. |
| 2011/0160400 | A1* | 6/2011 | Lee et al. ............... 525/64 |
| 2012/0115761 | A1 | 5/2012 | Basu |
| 2013/0001483 | A1 | 1/2013 | Lee et al. |
| 2013/0234084 | A1 | 9/2013 | Chung et al. |

FOREIGN PATENT DOCUMENTS

| | | |
|---|---|---|
| CN | 101497630 A | 8/2009 |
| CN | 101747610 A | 6/2010 |
| CN | 101805567 A | 8/2010 |
| EP | 0319971 A2 | 6/1989 |
| EP | 0628599 A1 | 12/1994 |
| EP | 0663410 A1 | 7/1995 |
| EP | 0725315 A2 | 8/1996 |
| EP | 1739109 A1 | 1/2007 |
| EP | 2657292 A1 | 10/2013 |
| JP | 02-70712 A | 3/1990 |
| JP | 07-140654 A | 6/1995 |
| JP | 08-262707 A | 10/1996 |
| JP | 10-254133 A | 9/1998 |
| JP | 11-092964 A | 4/1999 |
| JP | 2000-075501 A | 3/2000 |
| JP | 2000-305262 A | 11/2000 |
| JP | 2002-244287 A | 8/2002 |
| JP | 2006-257126 A | 9/2006 |
| JP | 2008-298938 A | 12/2008 |
| JP | 2009-091458 A | 4/2009 |
| KR | 10-1980-0001251 B1 | 10/1980 |
| KR | 10-1992-7002502 | 9/1992 |
| KR | 10-1993-7000858 | 3/1993 |
| KR | 10-1994-0005617 | 6/1994 |
| KR | 10-1995-7000359 | 1/1995 |
| KR | 10-1995-0011163 B1 | 9/1995 |
| KR | 10-1995-7003746 | 9/1995 |
| KR | 10-1996-0029904 | 8/1996 |
| KR | 10-2001-0052338 A | 6/2001 |
| KR | 10-2006-0111178 | 10/2006 |
| KR | 10-0817563 B1 | 3/2008 |
| KR | 10-0832518 B1 | 5/2008 |
| KR | 10-2008-0089122 A | 10/2008 |
| KR | 10-0885819 B1 | 2/2009 |
| KR | 10-2009-0024561 A | 3/2009 |
| KR | 10-2009-0038191 A | 4/2009 |
| KR | 10-2009-0066204 A | 6/2009 |
| KR | 10-2009-0066242 A | 6/2009 |
| KR | 10-2010-0049458 A | 5/2010 |
| KR | 10-2010-0098882 A | 9/2010 |
| KR | 10-2011-0077881 A | 7/2011 |
| KR | 10-2011-0078238 A | 7/2011 |
| TW | 406214 B | 9/2000 |
| TW | 200916955 A | 4/2009 |
| TW | 201030461 A | 8/2010 |
| WO | 99/58593 A1 | 11/1999 |
| WO | 2008/120854 A1 | 10/2008 |
| WO | 2009/078593 A1 | 6/2009 |
| WO | 2009/116722 A1 | 9/2009 |
| WO | 2012/015128 A1 | 2/2012 |
| WO | 2012/060514 A1 | 5/2012 |
| WO | 2012/060515 A1 | 5/2012 |
| WO | 2012/081761 A1 | 6/2012 |

OTHER PUBLICATIONS

UL IDES Properties for PMMA, http://plastics.ides.com/generics/3/c/t/acrylic-acrylic-properties-processing, downloaded on Dec. 19, 2012, pp. 1-4.
Notice of Allowance in commonly owned U.S. Appl. No. 13/353,710 mailed on Aug. 14, 2014, pp. 1-14.
Search Report in commonly owned Chinese Application No. 201210007804.5 dated Dec. 1, 2013, pp. 1-4.
Office Action dated Nov. 22, 2013, in commonly owned Taiwanese Patent Application No. 101103253, pp. 1-3.
Search Report dated Nov. 21, 2013, in commonly owned Taiwanese Patent Application No. 101103253, p. 1.
Canniccioni et al., " Polymerization of a Phosphonated Methacrylate via a Raft Living Radical Polymerization," Polymer Preprints, American Chemical Society, Division of Polymer Chemistry, 2001, 52(2), 645-646.
Office Action in commonly owned U.S. Appl. No. 13/353,710 mailed on Apr. 28, 2014, pp. 1-15.
Notice of Allowance in commonly owned U.S. Appl. No. 13/353,710 mailed on Sep. 5, 2013, pp. 1-12.
Final Office Action in commonly owned U.S. Appl. No. 13/353,710 mailed on May 17, 2013, pp. 1-14.
Office Action in commonly owned U.S. Appl. No. 12/966,133 mailed on Jan. 3, 2013, pp. 1-20.
Final Office Action in commonly owned U.S. Appl. No. 12/966,133 mailed on Jun. 28, 2013, pp. 1-23.
Price et al., "Flame retardance of poly(methyl methacrylate) modified with phosphorus-containing compounds", Polymer Degradation and Stability, vol. 77, (2002) pp. 227-233.
Office Action in commonly owned U.S. Appl. No. 13/872,230 mailed Dec. 18, 2014, pp. 1-10.
Notice of Allowance in commonly owned U.S. Appl. No. 13/914,856 mailed Jan. 13, 2016, pp. 1-11.
Supplemental Notice of Allowability in commonly owned U.S. Appl. No. 13/914,856 mailed Feb. 4, 2016, pp. 1-7.
International Search Report in counterpart International Application No. PCT/KR2010/009539 dated Jan. 18, 2012, pp. 1-6.
Notice of Allowance in commonly owned U.S. Appl. No. 13/872,240 mailed Aug. 20, 2014, pp. 1-9.
Office Action in commonly owned Korean Application No. 10-2010-0127795 dated Aug. 7, 2013, pp. 1-14.
Korean Office Action in commonly owned Korean Application No. 10-2010-0109991 dated Apr. 12, 2013, pp. 1-6.
International Search Report in commonly owned International Application No. PCT/KR2010/009532 dated Dec. 19, 2011, pp. 1-2.
Korean Office Action in commonly owned Korean Application No. 10-2010-0109988 dated Jun. 19, 2013, pp. 1-5.
Chinese Office Action in commonly owned Chinese Application No. 201080070004.7 dated Feb. 19, 2014, pp. 1-7.
English-translation of Chinese Office Action in commonly owned Chinese Application No. 201080070004.7 dated Feb. 19, 2014, pp. 1-7.
Hong et al., "Preparation and Properties of Flame Retardant Acrylate Rubber," China Synthetic Rubber Industry, vol. 23, No. 2, pp. 92-94 ; Mar. 2000.
Jin et al., "Polyacrylates Flame Retardants," Chinese Journal of Colloid & polymer, vol. 19, No. 4, pp. 41-43, 2001.
International Search Report in commonly owned International Application No. PCT/KR2010/009533 dated Dec. 19, 2011, pp. 1-2.
Office Action in commonly owned U.S. Appl. No. 13/872,240 mailed Feb. 24, 2014, pp. 1-8.
Office Action in commonly owned U.S. Appl. No. 13/914,856 mailed Oct. 14, 2014, pp. 1-10.
International Search Report in counterpart International Application No. PCT/KR2010/009538 dated Sep. 16, 2011, pp. 1-4.
Price et al., "Ignition temperatures and pyrolysis of a flame-retardant methyl methacrylate copolymer containing diethyl (methacryloyloxymethyl)-phosphonate units", Polymer International, Oct. 5, 2000, vol. 49, pp. 1164-1168.
Price et al., "Flame retarding poly(methyl methacrylate) with phosphorous-containing compounds: comparison of an additive with a reactive approach", Polymer Degradation and Stability, 2001, vol. 74, pp. 441-447.

* cited by examiner

TRANSPARENT THERMOPLASTIC RESIN COMPOSITION

CROSS-REFERENCE TO RELATED APPLICATIONS

This application is a continuation-in-part of International Application No. PCT/KR2010/009538, filed Dec. 29, 2010, pending, which designates the U.S., published as WO 2012/015128, and is incorporated herein by reference in its entirety, and claims priority therefrom under 35 USC Section 120. This application also claims priority under 35 USC Section 119 from Korean Patent Application No. 10-2010-0072920, filed Jul. 28, 2010, in the Korean Intellectual Property Office, the entire disclosure of which is also incorporated herein by reference.

FIELD OF THE INVENTION

The present invention relates to transparent thermoplastic resin compositions that can have excellent flame retardancy and heat resistance.

BACKGROUND OF THE INVENTION

Thermoplastic resins exhibit excellent physical properties such as lower specific gravity, good moldability and impact resistance, as compared with glass or metal. Recently, with the trend of low cost and increasingly larger and lighter weight electronics, plastic products made of thermoplastic resins have been quickly replacing existing glass or metal based products, thereby broadening applications thereof to fields from electronics to automobile components.

In particular, recently, due to increasingly thinner electric and electronic products and change in design concept, there is an increasing need for transparent resins, which leads to increasing demand for functional transparent materials obtained by imparting functionalities such as scratch resistance and flame retardancy to existing transparent resins. In addition, development of resins having good scratch resistance is significantly demanded in the field of exterior materials.

In general, in order to improve scratch resistance of plastics, a hard coating method is widely employed in which organic-inorganic hybrid materials are doped into a surface of a final molded resin, followed by curing the surface using heat or ultraviolet irradiation, thereby improving scratch resistance of the resin surface. However, in such a hard coating method, an additional coating process is required, thereby causing a need for additional process time and cost increase as well as environmental problems. Accordingly, there is a need for non-painted resins exhibiting scratch resistance without hard coatings.

Meanwhile, systems in which flame retardants are added to polycarbonate resins have been employed as transparent flame retardant materials.

Polycarbonate resins are engineering plastics exhibiting not only excellent mechanical strength, flame retardancy, transparency and weather resistance but also good impact resistance, thermal stability, self extinguishability, dimensional stability and the like, and thus have been widely used in the production of electric and electronic products and automobile components. In addition, polycarbonates can replace glass in products such as lenses where both transparency and impact resistance are required. However, polycarbonates have a disadvantage in that they exhibit very poor scratch resistance. The flame retardant polycarbonate resins have scratch resistance in a pencil hardness level of about B—F, which is much less than a pencil hardness level of H~3H required of scratch resistant resins.

Meanwhile, as existing transparent scratch resistant materials, mention can be made of acrylic resins represented by polymethyl methacrylate (PMMA). PMMA exhibits excellent scratch resistance in addition to good transparency, weather resistance and mechanical strength. However, PMMA exhibits poor impact resistance and flame retardancy. In order to supplement this, phosphorous flame retardants may be added to PMMA. However, it is difficult to obtain excellent flame retardancy, and physical properties such as heat resistance and impact strength can be reduced. Furthermore, there is no report up to now that flame retardancy is accomplished with the use of transparent acrylic resins alone.

As explained above, with the widespread use of resins as an exterior material of electric and electronic products, there has been increasing demand for transparent flame retardant and scratch resistant resins exhibiting transparency, scratch resistance and flame retardancy while maintaining good physical properties such as mechanical strength, heat resistance and the like. However, such products have yet to be made commercially available.

SUMMARY OF THE INVENTION

The present invention provides a transparent thermoplastic resin composition that can have excellent flame retardancy and heat resistance while maintaining good transparency and scratch resistance.

The present invention also provides a transparent thermoplastic resin composition that can have excellent mechanical properties and flowability together with the above mentioned properties.

In accordance with the present invention, there is provided a transparent thermoplastic resin composition that can have excellent flame retardancy and heat resistance, which includes, as a base resin, a phosphorus-based acrylic copolymer resin (A) including a unit of at least one acrylic monomer (a1) represented by Formula 1 and a unit of at least one phosphorus-based acrylic monomer (a2) represented by Formula 2:

[Formula 1]

wherein $R_1$ is —H or —$CH_3$, and $R_2$ is —$(CH_2)_n$—$CH_3$, where n is an integer from 0 to 18; and

[Formula 2]

wherein $R_1$ is —H or —$CH_3$,
$R_3$ is,

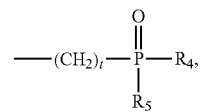

t is an integer from 0 to 10, and
$R_4$ and $R_5$ are the same or different and are each independently —O—$(CH_2)_m$—$CH_3$, where m is an integer from 0 to 5, provided that at least one of $R_4$ and $R_5$ is —O—$CH_3$.

The present invention also provides a molded article produced from the transparent thermoplastic resin composition.

In one embodiment, the transparent thermoplastic resin composition of the present invention may include about 0.1 parts by weight to about 99 parts by weight of an acrylic resin (B) based on about 100 parts by weight of the phosphorus-based acrylic copolymer resin (A), or about 0.1 parts by weight to about 40 parts by weight of an acrylic impact modifier (C) based on about 100 parts by weight of the phosphorus-based acrylic copolymer resin (A). Alternatively, the transparent thermoplastic resin composition may include about 0.1 parts by weight to about 99 parts by weight of the acrylic resin (B) and about 0.1 parts by weight to about 40 parts by weight of the acrylic impact modifier (C), each based on about 100 parts by weight of the phosphorus-based acrylic copolymer resin (A).

In one embodiment, the phosphorus-based acrylic copolymer resin (A) may have a glass transition temperature (Tg) of about 80° C. or more.

In one embodiment, the phosphorus-based acrylic copolymer resin (A) may have a weight average molecular weight of about 50,000 g/mol to about 500,000 g/mol.

In one embodiment, the phosphorus-based acrylic copolymer resin (A) may have a phosphorous content ranging from about 1.5 wt % to about 10 wt %.

In one embodiment, the phosphorus-based acrylic copolymer resin (A) may have a refractive index ranging from about 1.480 to about 1.495.

In one embodiment, the phosphorus-based acrylic copolymer resin (A) may be prepared by bulk polymerization, emulsion polymerization, or suspension polymerization.

In one embodiment, the transparent thermoplastic resin composition may have flame retardancy of V2, V1 or V0 measured on a 3.2 mm thick specimen prepared from the transparent thermoplastic resin composition in accordance with UL94.

In one embodiment, the transparent thermoplastic resin composition may have a total light transmittance of about 80% or more measured on a 2.5 mm thick specimen prepared from the transparent thermoplastic resin composition, in accordance with ASTM D1003.

In one embodiment, the transparent thermoplastic resin composition may have a pencil hardness level from F to 3H measured on a 2.5 mm thick specimen prepared from the transparent thermoplastic resin composition in accordance with JIS K5401, or a BSP (Ball-type Scratch Profile) width from about 180 μm to about 300 μm.

In one embodiment, the transparent thermoplastic resin composition may have a degree of heat resistance (Vicat Softening Temperature) of about 70° C. or more measured on a 3.2 mm thick specimen in accordance with ISO R306.

The transparent thermoplastic resin composition according to the present invention including a phosphorus-based acrylic copolymer including phosphorus (meth)acrylic monomer units having good heat resistance can exhibit excellent flame retardancy, heat resistance, mechanical properties and/or flow properties together with already good transparency and scratch resistance.

DETAILED DESCRIPTION OF THE INVENTION

The present invention now will be described more fully hereinafter in the following detailed description of the invention, in which some, but not all embodiments of the invention are described with reference to the accompanying drawings. Indeed, this invention may be embodied in many different forms and should not be construed as limited to the embodiments set forth herein; rather, these embodiments are provided so that this disclosure will satisfy applicable legal requirements.

The transparent thermoplastic resin composition according to the present invention includes, as a base resin, a phosphorus-based acrylic copolymer resin (A) including (a1) a unit of at least one acrylic monomer represented by Formula 1 and (a2) a unit of at least one phosphorus-based acrylic monomer represented by Formula 2:

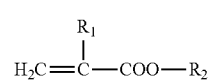

[Formula 1]

wherein $R_1$ is —H or —$CH_3$, and
$R_2$ is —$(CH_2)_n$—$CH_3$, where n is an integer from 0 to 18; and

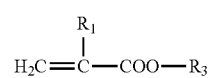

[Formula 2]

wherein $R_1$ is —H or —$CH_3$,
$R_3$ is

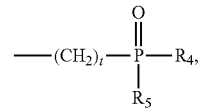

t is an integer from 0 to 10, and
$R_4$ and $R_5$ are the same or different and are each independently —O—$(CH_2)_m$—$CH_3$, where m is an integer from 0 to 5, provided that at least one of $R_4$ and $R_5$ is —O—$CH_3$.

Hereinafter, each component will be described in detail.

(A) Phosphorus-Based Acrylic Copolymer Resin

The phosphorus-based acrylic copolymer resin (A) of the present invention is a copolymer of a mixture of at least one acrylic monomer represented by Formula 1 and at least one phosphorus-based acrylic monomer represented by Formula 2, or a mixture of these copolymers.

The acrylic monomer (a1) of the present invention may be represented by Formula 1:

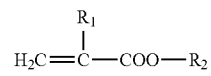

[Formula 1]

wherein
$R_1$ is —H or —$CH_3$, and
$R_2$ is —$(CH_2)_n$—$CH_3$, where n is an integer from 0 to 18.

Examples of the acrylic monomer (a1) represented by Formula 1 may include without limitation methyl(meth)acrylate, ethyl(meth)acrylate, propyl(meth)acrylate, butyl(meth)acrylate, hexyl(meth)acrylate and the like. These monomers may be used alone or in combination of two or more thereof.

The phosphorus-based acrylic monomer (a2) of the present invention may be represented by Formula 2:

[Formula 2]

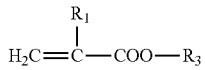

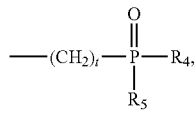

wherein
R$_1$ is —H or —CH$_3$,
R$_3$ is t is an integer from 0 to 10, and
R$_4$ and R$_5$ are the same or different and are each independently —O—(CH$_2$)$_m$—CH$_3$, where m is an integer from 0 to 5, provided that at least one of R$_4$ and R$_5$ is —O—CH$_3$.

The phosphorus-based acrylic copolymer produced using a unit of the compound of Formula 2 wherein R$_4$ and R$_5$ are —O—(CH$_2$)$_m$—CH$_3$ and wherein m is an integer from 0 to 5, provided that at least one of R$_4$ and R$_5$ is —O—CH$_3$, can exhibit excellent heat resistance. This can be compared to poor heat resistance of a phosphorus-based acrylic copolymer produced from a phosphorus-based acrylic monomer [for example, diethyl(methacryloyloxymethyl)phosphonate in which both R$_4$ and R$_5$ are —O—CH$_2$CH$_3$] having the same structure except for at least one of R$_4$ and R$_5$ not being —O—CH$_3$.

Examples of the phosphorus-based acrylic monomer (a2) represented by Formula 2 include without limitation dimethyl(methacryloyloxymethyl)phosphonate, dimethyl(acryloyloxymethyl)phosphonate, methylethyl(methacryloyloxymethyl)phosphonate, methylethyl(acryloyloxymethyl)phosphonate, dimethyl(methacryloyloxyethyl)phosphonate and the like. These monomers may be used alone or in combination of two or more thereof.

The phosphorus-based acrylic copolymer resin (A) of the present invention may further include a phosphorus-based acrylic monomer (a3) (which is different from the phosphorus-based acrylic monomer (a2) represented by Formula 2 above) represented by Formula 3 in addition to the acrylic monomer (a1) represented by Formula 1 and the phosphorus-based acrylic monomer (a2) represented by Formula 2:

[Formula 3]

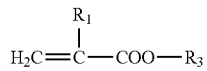

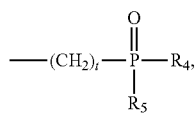

wherein
R$_1$ is —H or —CH$_3$,
R$_3$ is t is an integer from 0 to 10, and
R$_4$ and R$_5$ are the same or different and are each independently —O—(CH$_2$)$_m$—CH$_3$, where m is an integer from 1 to 5.

Specific examples of the phosphorus-based acrylic monomer (a3) represented by Formula 3 may include without limitation diethyl(methacryloyloxymethyl)phosphonate, diethyl(acryloyloxymethyl)phosphonate, diethyl(methacryloyloxyethyl)phosphonate, dipropyl(methacryloyloxymethyl)phosphonate, dipropyl(methacryloyloxyethyl)phosphonate and the like. These monomers may be used alone or in combination of two or more thereof.

The phosphorus-based acrylic copolymer resin (A) may be prepared by copolymerizing about 30 wt % to about 90 wt % of the acrylic monomer (a1) and about 10 wt % to about 70 wt % of the phosphorus-based acrylic monomer (a2) or a mixture of (a2) and (a3).

In some embodiments, the phosphorus-based acrylic copolymer resin (A) may include the acrylic monomer (a1) in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the acrylic monomer (a1) can be in a range from about any of the foregoing amounts to about any other of the foregoing amounts.

In some embodiments, the phosphorus-based acrylic copolymer resin (A) may include the phosphorus-based acrylic monomer (a2) or a mixture of (a2) and (a3) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of phosphorus-based acrylic monomer (a2) or a mixture of (a2) and (a3) can be in a range from about any of the foregoing amounts to about any other of the foregoing amounts.

When the phosphorus-based acrylic copolymer resin (A) includes the acrylic monomer (a1), the phosphorus-based acrylic monomer (a2), and/or a mixture of (a2) and (a3) in an amount within this range, polymerization can be easily carried out while ensuring appropriate flame retardancy and mechanical properties.

When the phosphorus-based acrylic monomer (a3) is further included, the weight ratio between (a2) and (a3) may be about 1:0.05 to about 1:5 and may be changed as necessary. When the phosphorus-based acrylic monomer (a3) is further included, and when the weight ratio between (a2) and (a3) is within this range, appropriate heat resistance can be ensured.

The phosphorus-based acrylic copolymer (A) may have a glass transition temperature of about 80° C. or more. When the phosphorus-based acrylic copolymer has a glass transition temperature of about 80° C. or more, appropriate heat resistance can be maintained, thereby allowing easy processing such as extrusion/injection.

Moreover, the phosphorus-based acrylic copolymer (A) of the present invention may have a weight average molecular weight from about 50,000 g/mol to about 500,000 g/mol, for example from about 50,000 g/mol to about 300,000 g/mol. When the phosphorus-based acrylic copolymer (A) has a weight average molecular weight within this range, excellent mechanical properties, flame retardancy and processability can be obtained.

Further, the phosphorus-based acrylic copolymer (A) of the present invention may have a phosphorus content from about 1.5 wt % to about 10 wt %. In some embodiments, the phosphorus-based acrylic copolymer (A) may have a phosphorus content in an amount of about 1.5, 2, 2.5, 3, 3.5, 4, 4.5, 5, 5.5, 6, 6.5, 7, 7.5, 8, 8.5, 9, 9.5, or 10 wt %. Further, according to some embodiments of the present invention, the phosphorus content of the phosphorus-based acrylic copolymer (A) can be in a range from about any of the foregoing amounts to about any other of the foregoing amounts.

When the phosphorus-based acrylic copolymer (A) has a phosphorous content in an amount within this range, the resin composition can exhibit flame retardancy and polymerization can be easily conducted, thereby providing appropriate mechanical properties.

The phosphorus-based acrylic copolymer (A) of the present invention may have a refractive index from about 1.480 to about 1.495. When the phosphorus-based acrylic copolymer (A) has a refractive index within this range, excellent transparency can be obtained in use of the acrylic resin (B) and the acrylic impact modifier (C) at the same time.

The phosphorus-based acrylic copolymer (A) of the present invention may be prepared by conventional bulk, emulsion and suspension polymerization methods, which are well known to those skilled in the art.

(B) Acrylic Resin

The transparent thermoplastic resin composition of the present invention may optionally include an acrylic resin (B).

Namely, as a base resin of the transparent thermoplastic resin composition of the present invention, the phosphorus-based acrylic copolymer resin (A) alone as mentioned above or a mixture of the phosphorus-based acrylic copolymer resin (A) and the acrylic resin (B) may also be used. For example, the acrylic resin (B) may be present in an amount of about 0.1 parts by weight to about 99 parts by weight, for example about 10 parts by weight to about 70 parts by weight, based on about 100 parts by weight of the phosphorus-based acrylic copolymer resin (A). In some embodiments, the composition may include the acrylic resin (B) in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 parts by weight. Further, according to some embodiments of the present invention, the amount of acrylic resin (B) can be in a range from about any of the foregoing amounts to about any other of the foregoing amounts.

When the composition includes the acrylic resin (B) in an amount within this range, appropriate mechanical properties and transparency can be ensured.

The acrylic resin (B) may be a polymer, a copolymer, or a mixture of at least one (meth)acrylic monomer.

The acrylic resin (B) has a linear structure and is characterized by having a weight average molecular weight of about 5,000 g/mol to about 300,000 g/mol and a refractive index of about 1.480 to about 1.495. When the acrylic resin (B) has a weight average molecular weight and/or refractive index within this range, appropriate mechanical properties can be ensured.

Examples of the (meth)acrylic monomer may include without limitation methyl methacrylate, ethyl methacrylate, n-propyl methacrylate, n-butyl methacrylate, hexyl methacrylate, cyclohexyl methacrylate, phenyl methacrylate, benzyl methacrylate, phenoxy methacrylate, phenoxyethyl methacrylate, methyl acrylate, ethyl acrylate, propyl acrylate, butyl acrylate, 2-ethylhexyl acrylate, 2-ethylhexyl methacrylate and the like. These (meth)acrylic monomers may be used alone or in combination of two or more thereof.

The acrylic resin (B) may be prepared by conventional bulk, emulsion and suspension polymerization methods. These methods are well known to a person skilled in the art to which the present invention pertains.

(C) Acrylic Impact Modifier

The transparent thermoplastic resin composition of the present invention may further include an acrylic impact modifier (C). Namely, the acrylic impact modifier (C) may be added to the phosphorus-based acrylic copolymer resin (A) alone or together with the acrylic resin (B).

The acrylic impact modifier may be a multi-layered graft copolymer obtained by polymerizing at least one of acrylic rubber monomers, such as butyl(meth)acrylate, hexyl(meth)acrylate, ethylhexyl(meth)acrylate, stearyl(meth)acrylate, and/or lauryl(meth)acrylate to yield a rubber polymer, and grafting at least one graft copolymerizable monomer such as methyl(meth)acrylate, ethyl(meth)acrylate, propyl(meth)acrylate, butyl(meth)acrylate, styrene, alpha-styrene, alkyl substituted styrene, acrylonitrile, methacrylonitrile, maleic anhydride, and/or C1-C10 alkyl or phenyl N-substituted maleimide onto the rubber polymer, and may have a refractive index from about 1.480 to 1.495.

The impact modifier may include a rubber component including a rubber polymer(s) in an amount of about 20 wt % to about 80 wt %, for example about 30 wt % to about 70 wt %, based on the total weight of the impact modifier. In some embodiments, the impact modifier may include a rubber component in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of rubber component can be in a range from about any of the foregoing amounts to about any other of the foregoing amounts.

When the impact modifier includes the rubber component in an amount within this range, appropriate mechanical properties and processability can be ensured.

In one embodiment, the acrylic impact modifier (C), mention can be made of IR-441 (MRC Company), M-210 (KANEKA Corporation), and the like, which are commercially available in the form of multilayered powder including butyl acrylate as a main component.

In the present invention, the acrylic impact modifier (C) may be selected depending on application. The acrylic impact modifier (C) may have a refractive index from about 1.480 to about 1.495.

The composition can include the acrylic impact modifier (C) in an amount of about 0.1 parts by weight to about 40 parts by weight, for example about 1 part by weight to about 20 parts by weight, based on about 100 parts by weight of the phosphorus-based acrylic copolymer resin (A). In some embodiments, the composition may include the acrylic impact modifier (C) in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments of the present invention, the amount of acrylic impact modifier (C) can be in a range from about any of the foregoing amounts to about any other of the foregoing amounts.

When the composition includes the acrylic impact modifier (C) in an amount within these ranges and/or has a refractive index within these ranges, transparency, processability and appropriate mechanical properties can be obtained at the same time.

In addition, the transparent thermoplastic resin composition according to the present invention may further include one or more additives. Examples of the additives include without limitation flame retardants, anti-dripping agents, impact modifiers, antioxidants, plasticizers, heat stabilizers, light stabilizers, pigments, dyes, inorganic additives, antimicrobial agents, antistatic agents and the like, and combinations thereof depending on use. The amount of such additives is well known to those skilled in the art.

When the phosphorus-based acrylic copolymer (A) according to the present invention is blended with the acrylic resin (B) and/or the acrylic impact modifier (C), the composition may exhibit excellent flame retardancy due to the phosphorus-based acrylic copolymer resin having phosphorus-based acrylic monomers introduced into the backbone while maintaining transparency and scratch resistance of the acrylic resin due to good compatibility and identical refractive index. Moreover, due to the use of the phosphorus-based acrylic copolymer having good heat resistance, the final transparent thermoplastic resin can exhibit not only good heat resistance but also good mechanical properties and flowability.

For example, the transparent thermoplastic resin composition can exhibit good transparency and scratch resistance since it may have a total light transmittance of about 80% or more in accordance with ASTM D1003 and a pencil hardness level from F to 3H in accordance with JIS K5401, which are measured on a 2.5 mm thick specimen prepared from the transparent thermoplastic resin composition, respectively. Further, the transparent thermoplastic resin composition may have flame retardancy higher than V2 (V2, V1 or V0) in accordance with UL94 and a degree of heat resistance (Vicat Softening Temperature) of about 70° C. or more measured on a 3.2 mm thick specimen prepared from the transparent thermoplastic resin composition, respectively.

Therefore, according to the present invention, a thermoplastic resin composition exhibiting excellent flame retardancy together with transparency, scratch resistance and heat resistance at the same time can be provided.

In addition, when the acrylic impact modifier (C) is further added to the resin composition, the resin composition may also have good impact strength.

The transparent thermoplastic resin composition of the present invention may be produced by well known methods for preparing resin compositions. For example, the components of the present invention and other additives can be mixed, subjected to melt extrusion in an extruder to prepare pellets and then the resulting pellets can be molded to form injection and compression molded articles.

The transparent thermoplastic resin composition of the present invention can have excellent scratch resistance, impact strength, transparency and/or moldability, and thus may be used for molding of various articles. In particular, it may be broadly applied as exterior materials of various electric and electronic components, parts and automobile components, lenses, window glass and the like.

For example, the transparent thermoplastic resin composition of the present invention may be molded and applied as electric or electronic home appliances, such as televisions, stereo systems, washing machines, cassette players, MP3 players, telephones, game consoles, video players, computers, photocopiers, and the like, and interior/exterior materials of automobiles, such as dashboards of automobiles, instrument panels, door panels, quarter panels, wheel covers, and the like.

Examples of the molding methods include extrusion, injection molding or casting and the like, without being limited thereto. Further, the molding methods are well known to those skilled in the art.

Now, the present invention will be explained in more detail with reference to the following examples. These examples are provided for illustration only and are not to be in any way construed as limiting the present invention.

Details of components used in Examples and Comparative Examples are as follows.

(A) Phosphorus-Based Acrylic Copolymer Resin (A1) Phosphorus-Based Acrylic Copolymer-1

A copolymer prepared by suspension polymerization using 60 wt % of a methyl methacrylate monomer and 40 wt % of dimethyl(methacryloyloxymethyl)phosphonate, which has a glass transition temperature of 96° C. and a weight average molecular weight of 80,000 g/mol, is used.

(A2) Phosphorus-Based Acrylic Copolymer-2

A copolymer prepared by suspension polymerization using 70 wt % of a methyl methacrylate monomer and 30 wt % of dimethyl(methacryloyloxymethyl)phosphonate, which has a glass transition temperature of 101° C. and a weight average molecular weight of 80,000 g/mol, is used.

(A3) Phosphorus-Based Acrylic Copolymer-3

A copolymer prepared by suspension polymerization using 60 wt % of a methyl methacrylate monomer and 40 wt % of dimethyl(methacryloyloxymethyl)phosphonate, which has a glass transition temperature of 101° C. and a weight average molecular weight of 150,000 g/mol, is used.

(A4) Phosphorus-Based Acrylic Copolymer-4

A copolymer prepared by a suspension polymerization method using 60 wt % of a methyl methacrylate monomer and 40 wt % of dimethyl(methacryloyloxymethyl)phosphonate, which has a glass transition temperature of 104° C. and a weight average molecular weight of 200,000 g/mol, is used.

(A5) Phosphorus-Based Acrylic Copolymer-5

A copolymer prepared by suspension polymerization using 60 wt % of a methyl methacrylate monomer, 20 wt % of dimethyl(methacryloyloxymethyl)phosphonate and 20 wt % of diethyl(methacryloyloxymethyl)phosphonate, which has a glass transition temperature of 85.5° C. and a weight average molecular weight of 80,000 g/mol, is used.

(A6) Phosphorus-Based Acrylic Copolymer-6

A copolymer prepared by suspension polymerization using 60 wt % of a methyl methacrylate monomer, 20 wt % of dimethyl(methacryloyloxymethyl)phosphonate and 20 wt % of diethyl(methacryloyloxymethyl)phosphonate, which has a glass transition temperature of 93° C. and a weight average molecular weight of 200,000 g/mol, is used.

(A7) Phosphorus-Based Acrylic Copolymer-7 Having Low Heat Resistance

A copolymer prepared by suspension polymerization using 60 wt % of a methyl methacrylate monomer and 40 wt % of diethyl(methacryloyloxymethyl)phosphonate, which has a glass transition temperature of 73° C. and a weight average molecular weight of 80,000 g/mol, is used.

(A8) Phosphorus-Based Acrylic Copolymer-8 Having Low Heat Resistance

A copolymer prepared by suspension polymerization using 70 wt % of a methyl methacrylate monomer and 30 wt % of diethyl(methacryloyloxymethyl)phosphonate, which has a glass transition temperature of 79° C. and a weight average molecular weight of 80,000 g/mol, is used.

(A9) Phosphorus-Based Acrylic Copolymer-9 Having Low Heat Resistance

A copolymer prepared by suspension polymerization using 60 wt % of a methyl methacrylate monomer and 40 wt % of diethyl(methacryloyloxymethyl)phosphonate, which has a glass transition temperature of 78° C. and a weight average molecular weight of 200,000 g/mol, is used.

(B) Acrylic Resin

A linear copolymer prepared by suspension polymerization using 97.5 wt % of a methyl methacrylate monomer and 2.5 wt % of methyl acrylate, which has a refractive index of 1.49, a glass transition temperature of 110° C. and a weight average molecular weight of 80,000 g/mol, is used.

(C) Acrylic Impact Modifier

As the acrylic impact modifier, M-210 (Kaneka Corporation) which is a multilayered prepared by grafting acrylic monomers and styrene monomers to a butyl acrylate rubber is used.

Examples 1 to 9 and Comparative Examples 1 to 7

The constitutional components are mixed in an amount as listed in Table 1, followed by melting and kneading extrusion to yield pellets. A twin-screw extruder having a diameter of 45 mm and L/D=29 is used for extrusion. The prepared pellets are dried at 80° C. for 6 hours and injection-molded in a 6 oz injection molding machine to prepare specimens.

Haze and total light transmittance (TT) of each specimen are measured on a 2.5 mm thick specimen using a Hazemeter NDH 2000 (Nippon Denshoku Co. Ltd.) in accordance with ASTM D1003. The haze value (%) is calculated from the ratio of diffused light transmittance (DF)/total light transmittance (TT). Transparency increases as the total light transmittance (TT) increases. The total light transmittance (TT) is represented by %.

The melt flow index (MI) of each specimen is measured at 220° C. and 10 kgf in accordance with ASTM D1238. Results are shown in Table 1. The melt flow index (MI) of each specimen is given in g/10 min.

The impact strength is measured on a ¼" unnotched Izod specimen in accordance with ASTM D256. Results are shown in Table 1. The impact strength is given in kgf·cm/cm.

The flexural modulus (FM) is measured in accordance with ASTM D790. Results are shown in Table 1. The flexural modulus is given in kgf/cm$^2$.

The heat resistance is measured on a 3.2 mm thick specimen under a load of 5 kg in accordance with ISO R306. The heat resistance is represented by Vicat Softening Temperature (VST) (° C.). Results are shown in Table 1.

The flame retardancy is measured on a 3.2 mm thick flame retardant specimen in accordance with UL 94 and evaluated as HB, V2, V1, and V0. Results are shown in Table 1.

The scratch resistance is measured by a pencil hardness test on a 2.5 mm thick specimen in accordance with JIS K5401 and by BSP (Ball-type Scratch Profile) test.

The BSP test is conducted by applying a scratch of a length of 10 to 20 mm onto a surface of resin specimens at a certain load and speed, and measuring a profile of the applied scratch through a surface profile analyzer manufactured by Ambios Corporation. The scratch resistance is evaluated from a scratch width, a scratch depth, a scratch range, and a scratch area. The surface profile analyzer measuring a scratch profile may be of a contact type or a non-contact type. In the case of the contact type, the surface profile analyzer may provide a scratch profile through surface scanning using a metal stylus tip having a diameter of 1~2 μm. In the case of the non-contact type, the surface profile analyzer may include optical spectrometers such as a three-dimensional microscope and AFM. In the present invention, a contact type surface profile analyzer (XP-1) of Ambios Corporation is used wherein the tip of a metal stylus has a diameter of 2 μm. A scratch width (μm), a measure of scratch resistance, is determined from the measured scratch profile. As the measured scratch width decreases, scratch resistance increases. The load applied upon measuring the scratch resistance is 1,000 g, the scratch speed was 75 mm/min, and the metal tip causing a scratch is a metal spherical tip having a diameter of 0.7 mm.

Pencil hardness is measured under a load of 500 g according to JIS K5401. Results are shown in Table 1. Pencil hardness grade is classified as below, and the scratch resistance increases as the grade moves to the right side.

[ . . . <4B<3B<2B<B<HB<F<H<2H<3H< . . . ]

TABLE 1

|  |  | Examples | | | | | | | | | Comparative Examples | | | | | | |
|---|---|---|---|---|---|---|---|---|---|---|---|---|---|---|---|---|---|
|  |  | 1 | 2 | 3 | 4 | 5 | 6 | 7 | 8 | 9 | 1 | 2 | 3 | 4 | 5 | 6 | 7 |
| (A) | (A1) | 100 | 100 | — | — | — | — | — | — | — | — | — | — | — | — | — | — |
|  | (A2) | — | — | 100 | — | — | — | — | — | — | — | — | — | — | — | — | — |
|  | (A3) | — | — | — | 100 | — | — | — | — | — | — | — | — | — | — | — | — |
|  | (A4) | — | — | — | — | 100 | — | — | — | — | — | — | — | — | — | — | — |
|  | (A5) | — | — | — | — | — | 100 | — | — | — | — | — | — | — | — | — | — |
|  | (A6) | — | — | — | — | — | — | 100 | — | — | — | — | — | — | — | — | — |
|  | (A7) | — | — | — | — | — | — | — | 75 | — | 100 | 100 | 100 | 100 | 75 | 100 | 100 |
|  | (A8) | — | — | — | — | — | — | — | — | — | — | — | — | — | — | — | — |
|  | (A9) | — | — | — | — | — | — | — | 25 | 100 | — | — | — | — | 25 | — | — |
| (B) |  | 10 | 15 | 10 | 10 | 10 | 10 | 10 | 10 | 0 | 10 | 15 | 10 | 10 | 10 | 0 | 10 |
| (C) |  | 1.7 | 2.5 | 1.6 | 1.8 | 2.0 | 1.8 | 1.9 | 1.9 | 1.5 | 1.8 | 2.6 | 1.7 | 2.0 | 2.0 | 1.6 | 1.4 |
| Haze |  | 89 | 87 | 89 | 89 | 88 | 89 | 88 | 88 | 90 | 89 | 86 | 89 | 87 | 88 | 90 | 90 |
| Total light transmittance |  |  |  |  |  |  |  |  |  |  |  |  |  |  |  |  |  |
| MI |  | 20.7 | 17.3 | 20.0 | 17.4 | 15.7 | 24.2 | 21.1 | 18.5 | 22.5 | 26.5 | 22.7 | 24 | 21.9 | 24.3 | 28.0 | 10.2 |
| Impact strength |  | 18 | 22 | 19 | 20 | 21 | 19 | 23 | 19 | 13 | 20 | 23 | 20 | 22 | 20 | 14 | 20 |
| Flexural Modulus (FM) |  | 26475 | 25032 | 27067 | 26980 | 27011 | 25878 | 26025 | 27593 | 29600 | 21599 | 20639 | 22135 | 21870 | 22779 | 25429 | 27867 |
| Heat resistance |  | 85.3 | 84.7 | 89 | 88 | 90.2 | 78.5 | 85.3 | 88.4 | 89.1 | 62.8 | 61.6 | 67.5 | 66.9 | 70.2 | 65.4 | 93.8 |
| Flame retardancy (UL94) |  | V0 | V1 | V1 | V0 | V0 | V0 | V0 | V1 | V0 | V0 | V1 | V1 | V0 | V0 | V0 | HB |
| Scratch resistance |  | 2H | H | 2H | 2H | 2H | H | H | 2H | 3H | H | F | H | H | H | H | 2H |
| BSP Width |  | 227 | 245 | 226 | 229 | 230 | 241 | 245 | 229 | 205 | 272 | 303 | 263 | 275 | 260 | 246 | 230 |

In Examples 1 to 9 and Comparative Examples 1 to 7 of Table 1, when the phosphorus-based acrylic copolymer resin is used alone or in combination with the acrylic resin, good scratch resistance is obtained while maintaining transparency and scratch resistance of existing acrylic resins (Comparative Example 7).

When the phosphorus monomer having low heat resistance alone is used as in Comparative Examples 1 to 5, although good transparency and flame retardancy and good flowability are obtained, the scratch resistance and mechanical properties are decreased and heat resistance is greatly decreased, as compared with existing acrylic resins. If the amount of the phosphorus-based acrylic monomer is decreased (Comparative Example 3) or the molecular weight of the copolymer is increased (Comparative Example 4), a slight increase in heat resistance is noticed, but there is difficulty using the compositions in exterior materials for electric and electronic products due to low heat resistance.

When the phosphorus-based acrylic copolymer is prepared using a phosphorus-based acrylic monomer having good heat resistance alone or in combination of two or more monomers as in Examples 1 to 9 of the present invention, excellent flame retardancy is obtained while maintaining the transparency of existing acrylic resin, and further the heat resistance, scratch resistance and mechanical properties are not significantly decreased. If the amount of the phosphorus-based acrylic monomer is decreased (see Example 3) or the molecular weight of the copolymer is increased (see Examples 4 and 5), a slight decrease in flowability is noticed, but heat resistance became higher.

In Examples 1 to 9 using the phosphorus acrylic copolymer, flowability is remarkably increased as compared with acrylic resin alone, but due to brittleness of the copolymer, a slight decrease in impact strength is noticed. If the amount of the impact modifier is increased as in Example 1 or the molecular weight of the copolymer is increased as in Examples 4 and 5, the degree of improvement in flowability is lowered slightly, but still good flowability and high impact resistance are obtained.

When the phosphorus-based acrylic monomer having low heat resistance is combined with the phosphorus-based acrylic monomer having high heat resistance as in Examples 6 and 7, the degree of decrease in heat resistance and scratch resistance are lowered, thereby showing relatively good heat resistance and scratch resistance together with good flowability.

When the phosphorus-based acrylic copolymer is used alone (see Example 9), the composition has a refractive index of 1.48 to 1.495, which is similar to that of existing acrylic resin, thereby allowing combined use thereof (see Example 8). When the acrylic impact modifier is employed (see Examples 1 to 8), it is found that transparency is maintained.

The thermoplastic resin composition according to the present invention can have advantages of excellent transparency, scratch resistance, flame retardancy, heat resistance, mechanical properties and/or flowability. Accordingly, the thermoplastic resin composition may be suitably applied as various exterior materials and parts, particularly electric and electronic products requiring such physical properties.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A transparent thermoplastic resin composition comprising a phosphorus-based acrylic copolymer resin (A) and about 0.1 parts by weight to about 40 parts by weight based on about 100 parts by weight of the phosphorus-based acrylic copolymer resin (A) of an acrylic impact modifier (C), wherein the phosphorus-based acrylic copolymer resin (A) comprises (a1) at least one acrylic monomer represented by Formula 1 and (a2) at least one phosphorus-based acrylic monomer represented by Formula 2:

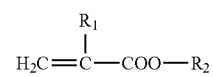

[Formula 1]

wherein $R_1$ is —H or —$CH_3$, and
$R_2$ is —$(CH_2)_n$—$CH_3$, where n is an integer from 0 to 18; and

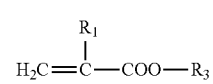

[Formula 2]

wherein $R_1$ is —H or —$CH_3$,
$R_3$ is

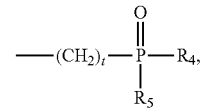

t is an integer from 0 to 10, and
$R_4$ and $R_5$ are the same or different and are each independently —O—$(CH_2)_m$—$CH_3$, where m is an integer from 0 to 5, provided that at least one of $R_4$ and $R_5$ is —O—$CH_3$, wherein the phosphorus-based acrylic copolymer resin (A) has a glass transition temperature (Tg) of about 80° C. or more, and wherein the phosphorus-based acrylic copolymer resin (A) has a weight average molecular weight of about 50,000 g/mol to about 500,000 g/mol.

2. The transparent thermoplastic resin composition according to claim 1, wherein the phosphorus-based acrylic copolymer resin (A) further comprises a phosphorus-based acrylic monomer (a3) represented by Formula 3:

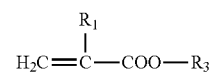

[Formula 3]

wherein $R_1$ is —H or —$CH_3$, $R_3$ is

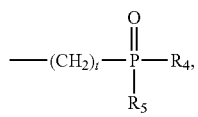

t is an integer from 0 to 10, and $R_4$ and $R_5$ are the same or different and are each independently —O—$(CH_2)_m$—$CH_3$, where m is an integer from 1 to 5.

3. The transparent thermoplastic resin composition according to claim 1, wherein the composition further comprises an acrylic resin (B).

4. The transparent thermoplastic resin composition according to claim 3, comprising the acrylic resin (B) in an amount of about 0.1 parts by weight to about 99 parts by weight based on about 100 parts by weight of the phosphorus-based acrylic copolymer resin (A).

5. The transparent thermoplastic resin composition according to claim 3, comprising the acrylic resin (B) and the acrylic impact modifier (C) in an amount of about 0.1 parts by weight to about 99 parts by weight and about 0.1 to about 40 parts by weight, respectively, based on about 100 parts by weight of the phosphorus-based acrylic copolymer resin (A).

6. The transparent thermoplastic resin composition according to claim 1, wherein the phosphorus content of the phosphorus-based acrylic copolymer resin (A) ranges from about 1.5 wt % to about 10 wt %.

7. The transparent thermoplastic resin composition according to claim 1, wherein the phosphorus-based acrylic copolymer resin (A) has a refractive index from about 1.48 to about 1.495.

8. The transparent thermoplastic resin composition according to claim 1, wherein the phosphorus-based acrylic monomer (a2) comprises dimethyl (methacryloyloxymethyl) phosphonate, dimethyl (acryloyloxymethyl) phosphonate, methylethyl (methacryloyloxymethyl) phosphonate, methylethyl (acryloyloxymethyl) phosphonate, dimethyl (methacryloyloxyethyl) phosphonate, or a combination thereof.

9. The transparent thermoplastic resin composition according to claim 2, wherein the phosphorus-based acrylic monomer (a3) comprises diethyl (methacryloyloxymethyl) phosphonate, diethyl (acryloyloxymethyl) phosphonate, diethyl (methacryloyloxyethyl) phosphonate, dipropyl (methacryloyloxymethyl) phosphonate, dipropyl (methacryloyloxyethyl) phosphonate, or a combination thereof.

10. The transparent thermoplastic resin composition according to claim 3, wherein the acrylic resin (B) comprises a polymer or a copolymer of methyl methacrylate, ethyl methacrylate, n-propyl methacrylate, n-butyl methacrylate, hexyl methacrylate, cyclohexyl methacrylate, phenyl methacrylate, benzyl methacrylate, phenoxy methacrylate, phenoxyethyl methacrylate, methyl acrylate, ethyl acrylate, propyl acrylate, butyl acrylate, 2-ethylhexyl acrylate, 2-ethylhexyl methacrylate, or a combination thereof, and wherein the acrylic resin (B) has a weight average molecular weight from about 5,000 g/mol to about 300,000 g/mol and a refractive index from about 1.480 to about 1.495.

11. The transparent thermoplastic resin composition according to claim 1, wherein the acrylic impact modifier (C) comprises a multilayered graft copolymer obtained by polymerizing an acrylic rubber monomer including butyl (meth)acrylate, hexyl (meth)acrylate, ethylhexyl (meth)acrylate, stearyl (meth)acrylate, lauryl (meth)acrylate, or a combination thereof to provide a rubber polymer, and grafting at least one graft copolymerizable monomer including methyl (meth)acrylate, ethyl (meth)acrylate, propyl (meth)acrylate, butyl (meth)acrylate, styrene, alpha-styrene, C1-C10 alkyl substituted styrene, acrylonitrile, methacrylonitrile, maleic anhydride, C1-C10 N-substituted maleimide, phenyl N-substituted maleimide, or a combination thereof onto the rubber polymer, wherein the acrylic impact modifier (C) has a refractive index from about 1.480 to about 1.495.

12. The transparent thermoplastic resin composition according to claim 1, wherein the transparent thermoplastic resin composition has a total light transmittance of about 80% or more measured on a 2.5 mm thick specimen in accordance with ASTM D1003.

13. The transparent thermoplastic resin composition according to claim 1, wherein the transparent thermoplastic resin composition has a pencil hardness level from F to 3H measured on a 2.5 mm thick specimen in accordance with JIS K5401, or BSP width from about 180 μm to about 300 μm.

14. The transparent thermoplastic resin composition according to claim 1, wherein the transparent thermoplastic resin composition has a Vicat Softening Temperature of about 70° C. or more measured on a 3.2 mm thick specimen in accordance with ISO R306.

15. The transparent thermoplastic resin composition according to claim 1, wherein the transparent thermoplastic resin composition has flame retardancy of any one of V2, V1 and V0 measured on a 3.2 mm thick specimen in accordance with UL94.

16. The transparent thermoplastic resin composition according to claim 1, further comprising flame retardant, antimicrobial agent, releasing agent, heat stabilizer, antioxidant, light stabilizer, compatibilizer, dye, inorganic additives, surfactant, nucleating agent, coupling agent, filler, plasticizer, impact modifier, blending agent, coloring agent, stabilizer, lubricant, antistatic agent, pigment, fire-proofing agent, or a combination thereof.

17. A molded article produced from the transparent thermoplastic resin composition according to claim 1.

18. The transparent thermoplastic resin composition according to claim 1, wherein the phosphorus-based acrylic copolymer resin (A) has a glass transition temperature (Tg) of 96° C. or more.

19. The transparent thermoplastic resin composition according to claim 18, wherein the phosphorus-based acrylic copolymer resin (A) has a glass transition temperature (Tg) of 101° C. or more.

20. The transparent thermoplastic resin composition according to claim 19, wherein the phosphorus-based acrylic copolymer resin (A) has a weight average molecular weight of 80,000 g/mol to about 500,000 g/mol.

21. The transparent thermoplastic resin composition according to claim 1, wherein the phosphorus-based acrylic copolymer resin (A) has a weight average molecular weight of 80,000 g/mol to about 500,000 g/mol.

22. The transparent thermoplastic resin composition according to claim 1, wherein the transparent thermoplastic resin composition has a haze of 2.5% or less as measured on a 2.5 mm thick specimen using a Hazemeter NDH 2000 (Nippon Denshoku Co. Ltd.) in accordance with ASTM D1003.

23. The transparent thermoplastic resin composition according to claim 1, wherein the transparent thermoplastic resin composition has a haze of 1.6% to 2.5% as measured on a 2.5 mm thick specimen using a Hazemeter NDH 2000 (Nippon Denshoku Co. Ltd.) in accordance with ASTM D1003.

24. The transparent thermoplastic resin composition according to claim 1, wherein the phosphorus-based acrylic copolymer resin (A) consists of (a1) at least one acrylic monomer represented by Formula 1; (a2) at least one phosphorus-based acrylic monomer represented by Formula 2; and (a3) optionally at least one phosphorus-based acrylic monomer represented by Formula 3:

[Formula 3]

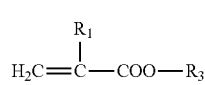

wherein $R_1$ is —H or —$CH_3$,
$R_3$ is

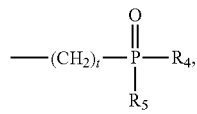

t is an integer from 0 to 10, and
$R_4$ and $R_5$ are the same or different and are each independently —O—$(CH_2)_m$—$CH_3$, where m is an integer from 1 to 5.

* * * * *